United States Patent Office 3,492,851
Patented Feb. 3, 1970

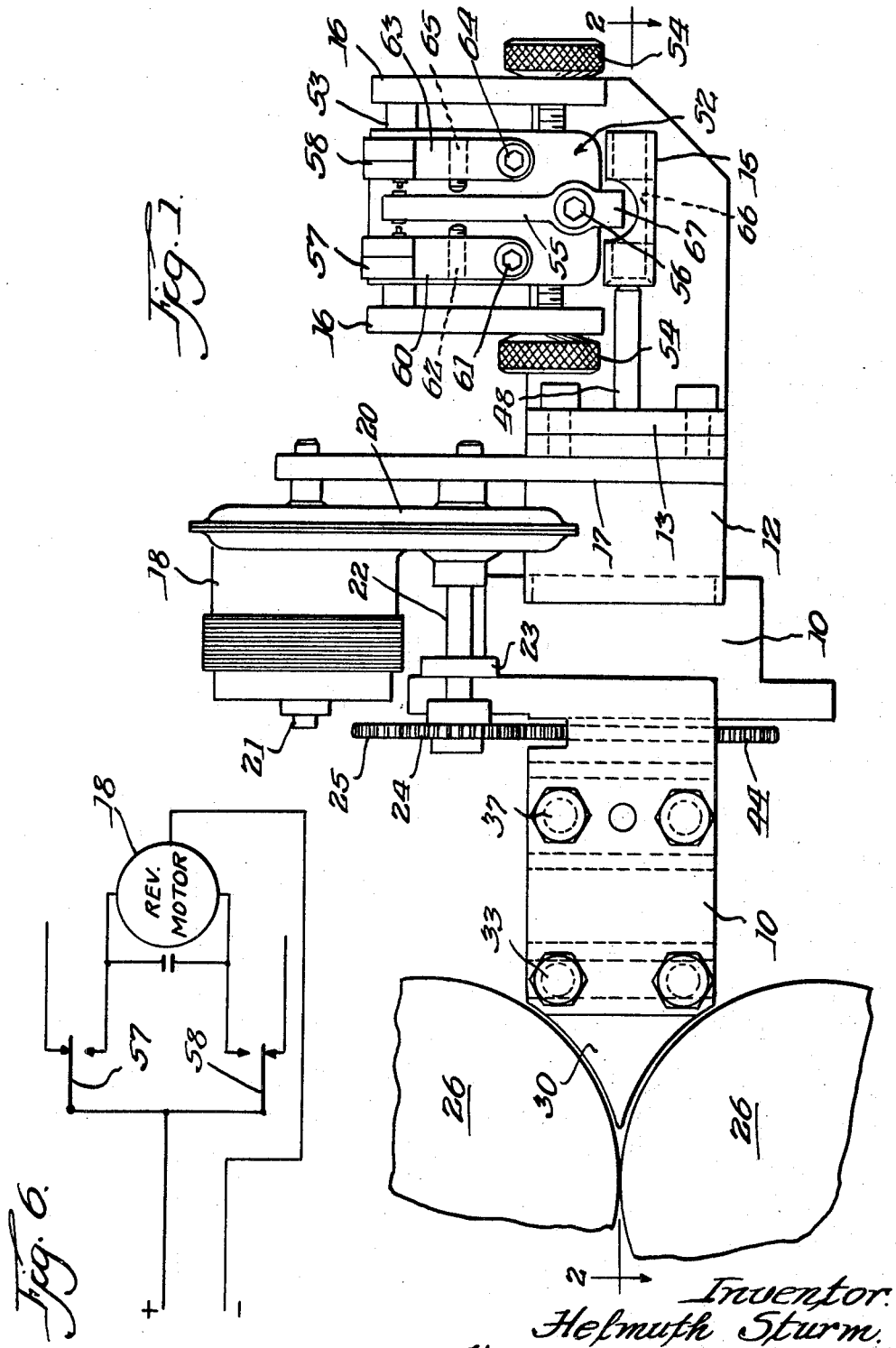

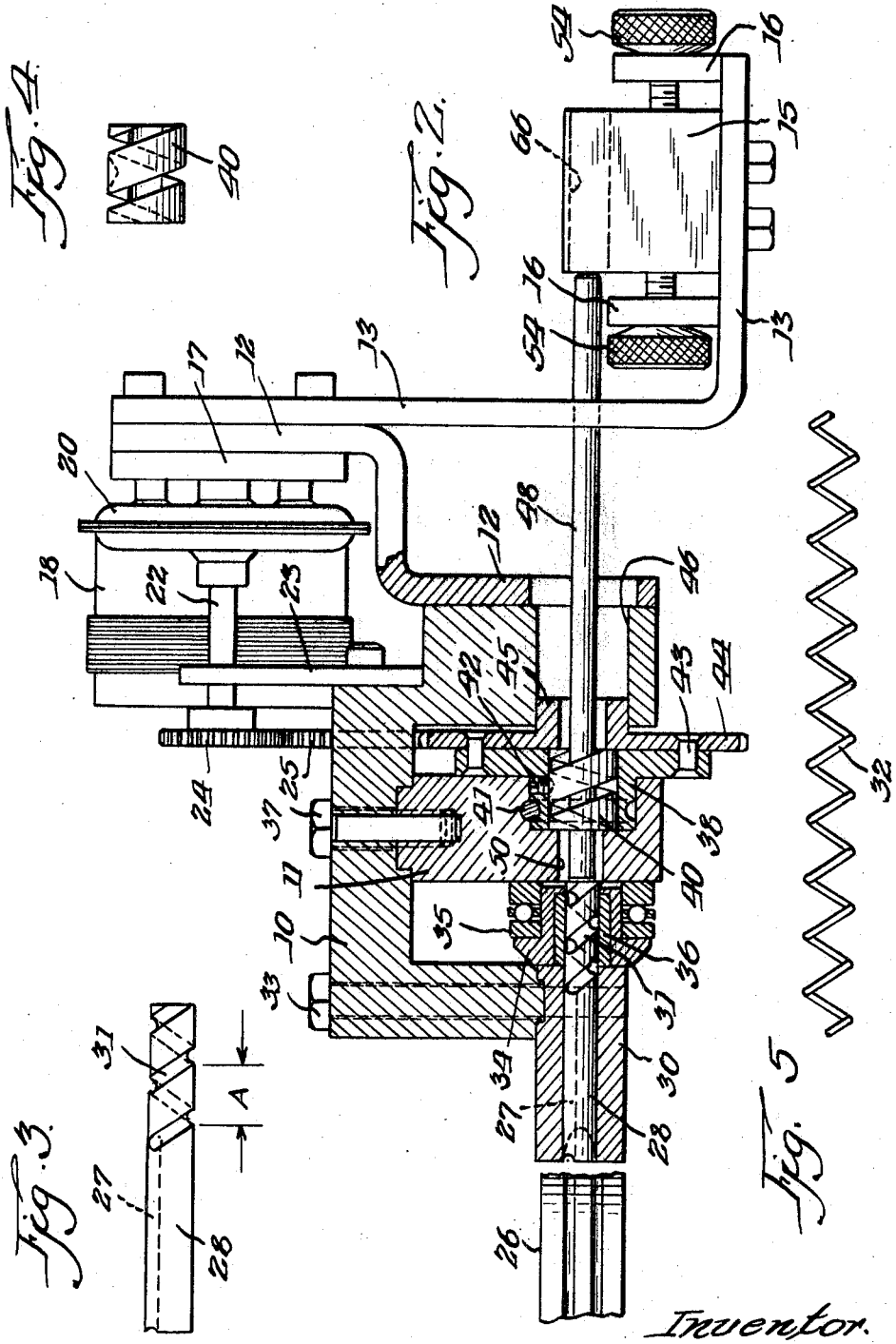

3,492,851
COMBINATION SPINDLE AND HELICAL FORMER
Helmuth Sturm, Kenosha, Wis., assignor to
Frank L. Wells Co., Kenosha, Wis.
Filed Feb. 19, 1968, Ser. No. 706,527
Int. Cl. B21f 3/04
U.S. Cl. 72—143                                    6 Claims

ABSTRACT OF THE DISCLOSURE

A conventional helical coiler is provided with a pitch adjusting device which automatically and accurately maintains the convolutions of the coil springs formed by the helical coiler at the same pitch for any and all character of wire fed to the coiler. The sizing nut of the coiler is adjusted as regards its rotative position by a reversible electric motor. An indicator finger rides within the convolutions of the coil spring and by its pivotal movement it actuates microswitches in the circuit of the electric motor so as to correct for variations in the pitch of the convolutions.

---

The invention relates to helical coilers for forming coil springs and has reference more particularly to a helical pitch adjusting device for automatically and accurately maintaining the convolutions of a coil spring at the same pitch as predetermined for the said coil spring.

In conventional formers for producing helical coil springs the space between convolutions will vary in thousandths of an inch depending on the composition of the wire used in producing the coil springs and other variations in characteristics of the wire. Although the composition of the wire and other factors are controlled as accurately as possible, nevertheless variations do occur with resulting variations in the pitch of the coil springs. It is desirable for a number of reasons and particularly in the manufacture of mattresses that the helical springs used in the assembling operation on mattresses have a constant pitch even though variations may occur from time to time in the composition and other characteristics of the wire.

Accordingly the objective of the invention is to provide conventional helical coilers with a pitch adjusting device which will automatically and accurately maintain the convolutions of the coil springs formed by the helical coilers at the same pitch for substantially any and all character of wire fed to the coiler.

Another and more specific object of the invention is to provide a pitch adjusting device which will employ a reversible motor for automatically advancing or retarding the sizing nut which will thereby have such an angular position in the helical coiler as to compensate for variations in the pitch of the coil springs as produced by the forming spindle assembly of the coiler.

Another object resides in the provision of a helical coiler for producing coil springs and which will incorporate a pitch adjusting device including a reversible electric motor and micro-switches for maintaining a constant pitch as regards the convolutions of the coil springs produced by the helical coiler.

With these and various other objects in view, the invention may consist of certain novel features of construction and operation, as will be more fully described and particularly pointed out in the specification, drawings and claims appended thereto.

In the drawings which illustrate an embodiment of the device and wherein like reference characters are used to designate like parts:

FIGURE 1 is a top plan view showing a helical coiler constructed in accordance with and which embodies the improvements of the invention;

FIGURE 2 is a vertical sectional view taken longitudinally of FIGURE 1 substantially along line 2—2 of said figure;

FIGURE 3 is an elevational view of the spindle former;

FIGURE 4 is an elevational view of the adjustable sizing nut;

FIGURE 5 is an elevational view showing a length of a helical coil spring such as is produced by the apparatus shown in FIGURES 1 and 2; and FIGURE 6 is a schematic view of a wiring diagram for the micro-switches and the reversible electric motor.

Referring to FIGURE 1 and 2 wherein it will be observed that the embodiment of the invention selected for illustration includes a supporting framework formed by the housing 10, the trunnion part 11, and the brackets 12 and 13. The bracket 13 in turn has the helical support block 15 suitably secured thereto and the bracket also provides the side frames 16. The bracket 12 is secured to the housing 10 as by welding so as to form a unit therewith and the bracket acts as a support for the bracket 13 and also as a support for the motor base 17 on which the electric motor 18 and speed reducing unit 20 are mounted. The motor shaft 21 of the electric motor 20 is operatively connected through the speed reducing unit 20 to the drive shaft 22 and which is journalled by the member 23. The end of the drive shaft extending beyond the frame member has the driving pinion 24 secured thereto.

The wire to be formed into a helical coil spring is fed by the feeding wheels 26 through the grooves 27 and 31 of the forming spindle 28. The said forming spindle is located in the spindle sleeve 30 and as shown in FIGURE 3 the groove 27 terminates in the helical grooves 31. The distance between adjacent grooves such as A is the pitch of the grooves 31 which initially form the wire into a helical coil 32 as best shown in FIGURE 5. The spindle sleeve 30 is suitably supported in position by the housing 10, the said sleeve being secured thereto by the securing screws 33. The forming end of the spindle is located within the spindle roller 34 which carries the thrust bearing 35 exteriorly thereof. Interiorly of the spindle roller the same is provided with a sleeve 36 of hard metal and thus said sleeve presents an anvil to the wire being formed as it progresses through the grooves 31.

The part 11 of the housing for the coiler may be termed a trunnion and said part is secured to the housing 10 by the securing screws 37. The trunnion is cored for receiving the sizing nut retainer 38. The retainer consists of a flange and a hub and the sizing nut 40 is held in fixed position mostly within the hub portion of the retainer. The retainer 38 is rotatable within the trunnion 11 but is held against movement in an axial direction by the transverse pin 41. However, the sizing nut 40 is fixed in position within the retainer by the set secrew 42. For rotating the sizing nut 40 in order to adjust the angular position of the nut, the flange part of the retainer is secured by the rivets 43 to the adjusting gear 44. Thus rotation of the adjusting gear will rotate the sizing nut 40 and in order to center the rotation with that of the retainer, the hub 45 of the adjusting gear is rotatably mounted in the cylindical passage 46 of the housing 10.

The helical support rod 48 is disposed axially of the sizing nut being supported in horizontal position by the said nut. The support rod 48 passes through a cored passage in the sizing nut and the rod has a tight fit sufficient to anchor the said rod in position during operation. During such operation the formed coil springs having telescoping relation on the rod are caused to move along the rod from left to right, FIGURE 2. The coil springs upon emerging from the grooves 31, are caused to enter and pass through the passage 50 in the trunnion 11 which receives the left end of the support rod 48. The coil springs are thus caused to telescope the support rod and after passing through the sizing nut 40 they move along the support rod to the helical support block 15 which is supported in position on the bracket 13. The micro-switch mechanism of the helical pitch adjusting device will now be described.

As best shown in FIGURE 1, a control block 52 is associated with the helical support block 15 and said control block at its far end is pivotally supported by the pivot shafts 53 from the side frames 16. For adjusting the position of the control block within the side frames as may be permitted by the pivot shafts 53, the locating screws 54 are provided. Each screw is threaded in its side frame 16 and each screw has a threaded connection with the control block. By rotation of the screws and which is facilitated by their knurled head, the control block can be shifted in position to a slight extent and when a proper adjustment is obtained the block is held by the screws.

The indicator finger 55 is pivotally mounted on the block 52 by the pivot screw 56 and said finger extends forwardly and has location between the spaced micro-switches 57 and 58. The switch 57 is mounted on the arm 60 which is secured at 61 to the control block. The arm carries a stop pin 62. In a similar manner the micro-switch 58 is carried by the arm 63 which is secured at 64 to the control block. Said arm 63 is provided with the stop pin 65.

The helical spring in telescoping relation on the support rod 48 will pass through the passage 66 in the helical support block 15. A portion of the block is cut away to expose the coil spring as it moves through the passage 66 and said exposed part of the coil spring is engaged by the end 67 of the indicator finger 55. The width of said end 67 is designed to ride between adjacent convolutions of the coil spring and thus the indicator finger is able to detect variations in pitch. Pivotal movement of the finger will actuate one of the micro-switches either 57 or 58. Since the switches are electrically connected to the reversible type motor 18, the adjusting gear 44 is rotated in either a clockwise or a counter-clockwise direction to angularly position the adjusting nut 40 whereby to correct the variation in pitch. The drive from the motor 18 takes place through the drive pinion 24 and through the idler gear 25 to the adjusting gear 44. Also it will be observed from the wiring diagram of FIGURE 6 that the micro-switches are normally open and that when either switch is closed the motor is caused to rotate in one direction or the other.

In the operation of the helical coiler as described, the coil spring upon leaving the spindle former 28 is caused to pass through the sizing nut 40. The normal operation of the nut is to elongate the coil spring by spreading the convolutions but only by a few thousandths of an inch. However, the extent to which the convolutions of the helical coil may be separated is controlled by the angular position of the sizing nut 40, and thus the nut is made angularly adjustable in accordance with the invention.

In the event the pitch of the convolutions become less than the precise pitch desired due to the composition of the wire or other physical characteristic, then the end 67 of the indicator finger 55 will be moved to the left and the finger will pivot in a clockwise direction to actuate the switch 58 closing its circuit to the reversible motor 18. The rotation of the motor will be such as to rotate the adjusting gear 44 and hus the sizing nut 40 to position the nut so as to expand or increase the pitch of the convolutions, thus correcting for the error in the pitch dimension as previously noted.

In the event the pitch of the convolutions of the helical coil spring as produced by the coiler is more than the precise pitch desired, then the end 67 will be moved to the right and the finger 55 will pivot in a counter-clockwise direction. The switch 57 will thus be actuated to close its circuit to the reversible motor 18. The direction of rotation of the motor is reversed and the sizing nut is thus retracted and so positioned angularly as to reduce the separating action on the coil spring. This action of the nut will thereby correct for the error as noted in the pitch dimension desired for the coil spring.

The invention is not to be limited to or by details of construction of the particular embodiment thereof illustrated by the drawings, as various other forms of the device will, of course, be apparent to those skilled in the art without departing from the spirit of the invention or the scope of the claims.

What is claimed is:

1. In a helical coiler for producing coil springs from a straight length of wire, the combination with a helical coil former, of a sizing nut positioned with respect to the helical coil former for receiving the coil springs formed thereby, said sizing nut elongating the coil springs by increasing the distance between convolutions and wherein the extent of said increase depends on the angular position of the sizing nut means mounting the sizing nut for rotation whereby its angular position can be adjusted, a pivotally mounted indicator finger having a part riding within adjacent convolutions of the coil springs at a location beyond the sizing nut, and means for effecting a rotative adjustment in the position of the sizing nut whereby to correct for any variation in the pitch of the helical coil springs as may be detected by the indicator finger.

2. In a helical coiler for producing coil springs from a straight length of wire as defined by claim 1, wherein the sizing nut is fixedly carried by a retainer, an adjusting gear fixed to said retainer, said adjusting gear and retainer comprising the means mounting the sizing nut for rotation, and wherein the means effecting a rotative adjustment in the position of the sizing nut includes a reversible electric motor and a gear train operatively connecting the said motor with the adjusting gear.

3. In a helical coiler for producing coil springs from a straight length of wire as defined by claim 1, wherein the means for effecting a rotative adjustment in the position of the sizing nut includes a reversible electric motor, and micro-switches electrically connected to said motor circuit and disposed on respective sides of the indcaitor finger for actuation thereof.

4. In a helical coiler of the character described, in combination, a housing, a helical coil former suspended from said housing, a spindle roller in associated relation with the helical coil former for producing helical coil springs in coaction therewith, a trunnion also suspended from the housing, a sizing nut, a retainer having said sizing nut fixedly mounted therein and which is disposed thereby in axial alignment with the helical coil former, an adjusting gear to which the retainer is secured, said retainer and adjusting gear being supported for rotation by the trunnion and housing respectively, a reversible electric motor for rotating the sizing nut through said adjusting gear, and means for causing operation of said electric motor for effecting rotative adjustment in the position of the sizing nut, whereby to correct for any variation in the pitch of the helical coil springs produced by the helical coil former.

5. A helical coiler of the character as described by claim 4, additionally including a pivotally mounted indicator finger, said finger having a part riding within adjacent convolutions of the coil springs at a location beyond the sizing nut, and micro-switches electrically connected to said motor circuit and disposed on respective sides of the indicator finger for actuation thereby.

6. A helical coiler of the character as described by claim 5, additionally including a stop pin located on each side of the indicator finger, whereby to limit the pivotal movement of the finger and protect the micro-switches from excessive actuation which might tend to damage the micro-switches.

References Cited
UNITED STATES PATENTS

| | | | |
|---|---|---|---|
| 2,868,268 | 1/1959 | Lewis et al. | 72—143 X |
| 3,378,045 | 4/1968 | Thurman | 72—143 X |

MILTON S. MEHR, Primary Examiner